(12) United States Patent
Beckman

(10) Patent No.: US 6,341,406 B1
(45) Date of Patent: Jan. 29, 2002

(54) GURNEY HANDLE

(76) Inventor: John Beckman, 6685 298th Ave., Clearwater, FL (US) 33761

(*) Notice: Subject to any disclaimer, the term of this patent is extended or adjusted under 35 U.S.C. 154(b) by 0 days.

(21) Appl. No.: 09/602,211

(22) Filed: Jun. 23, 2000

(51) Int. Cl.[7] .............................. B25G 1/04; A45F 5/10; A45C 3/00
(52) U.S. Cl. .................. 16/113.1; 16/900; 16/DIG. 41; 16/444; 280/47.34
(58) Field of Search ................................ 16/900, 113.1, 16/405, 429, 436, 437, 352, 353, 324, 326, 371, DIG. 40, DIG. 41, DIG. 38; 280/47.36, 47.34, 47.18, 47.38; 403/157, 150, 164, 165, 102, 99, 98; 5/86.1, 662, 658; 296/503.1, 20

(56) References Cited

U.S. PATENT DOCUMENTS

| | | | | |
|---|---|---|---|---|
| 1,676,073 A | * | 7/1928 | Brown | 16/371 |
| 3,057,655 A | | 10/1962 | Weil et al. | |
| 3,547,458 A | * | 12/1970 | Price | 280/47.34 |
| 3,655,297 A | * | 4/1972 | Bolen, Jr. et al. | 403/102 |
| 3,751,058 A | * | 8/1973 | Larsen | 280/47.18 |
| 3,785,669 A | * | 1/1974 | Doheny | 280/47.18 |
| 3,980,334 A | | 9/1976 | Ferneau et al. | |
| 4,025,208 A | * | 5/1977 | Donahue | 403/157 |
| 4,361,916 A | | 12/1982 | McDaniel | |
| 4,619,464 A | * | 10/1986 | Hwang | 280/655 |
| 5,044,650 A | | 9/1991 | Eberle, Jr. | |
| 5,244,225 A | | 9/1993 | Frycek | |
| 5,249,438 A | * | 10/1993 | Rhaney et al. | 280/655 |
| 5,566,418 A | * | 10/1996 | Steffen et al. | 16/113.1 |
| 5,580,207 A | | 12/1996 | Kiebooms et al. | |
| 5,653,096 A | * | 8/1997 | Edwards | 16/437 |
| 5,692,254 A | | 12/1997 | Boettcher | |
| 5,941,011 A | * | 8/1999 | Baker | 16/366 |
| 5,987,673 A | | 11/1999 | Smith | |

* cited by examiner

Primary Examiner—Chuck Y. Mah
(74) Attorney, Agent, or Firm—Dennis G. LaPointe; Mason & Associates, PA (57) ABSTRACT

A gurney handle with a generally U-shaped handle having a transverse member and two longitudinal generally parallel support members, wherein the distal end of each support member has means for attachment to a gurney frame member.

7 Claims, 14 Drawing Sheets

GURNEY HANDLE

BACKGROUND OF THE INVENTION

1. Field of the Invention

The invention relates to a handle for a gurney.

2. Description of Related Art

Handles for devices for moving sick, injured or immobile people are known in the art. However, none of the prior art teaches a gurney handle which can be attached to a gurney to allow a person to push or pull a gurney from a comfortable angle. Presently, gurneys are built so that a person can push or pull them. However, the gurney is generally to be pushed or pulled from the guard rail. The angle for the pushing or pulling thus puts an uncomfortable strain on the person pushing or pulling.

Known related art includes the wheelchair handle depicted in U.S. Pat. No. 5,044,650 to Eberle, Jr. and the wheelchair handle extension of U.S. Pat. No. 5,244,225 to Frycek. Frycek relates to handle extenders for a wheelchair for ascending or descending stairs with a wheelchair. Eberle, Jr. relates to an invention for the one-handed steering of a wheelchair. None of these prior art inventions address the reduction of stress to the person pushing or pulling a gurney. Also, these inventions relate to extensions for wheelchairs the handles of which are hollow.

Other known related art includes U.S. Pat. No. 5,987,673 to Smith and U.S. Pat. No. 5,692,254 to Boettcher. Smith is an undercarriage extension for a stretcher. However, the point at which a person steers the stretcher remain at the same level as the stretcher. Thus, with Smith, a person is still pushing or pulling the stretcher at an uncomfortable angle. Boettcher is an apparatus for lifting a person. The handle is an intrinsic part to the wheeled lift apparatus and is bolted onto brackets. It does not relate to attachment to a gurney.

None of the devices in the above references describe attaching a handle to a gurney. The proposed invention aids in maneuvering a gurney by making the point of pushing or pulling higher and easier to use than the support railing which would otherwise be used.

SUMMARY OF THE INVENTION

The present invention is a handle for a gurney. The principal object of the invention is to provide a gurney handle with a generally U-shaped handle having a transverse member and two longitudinal generally parallel support members, wherein the R distal end of each support member has means for attachment to a gurney frame member.

In one embodiment, the gurney handle comprises a generally U-shaped handle having a transverse member and two longitudinal generally parallel support members, each support member having a predetermined length and a proximal end and a distal end and the distal end of each support member having means for attachment to a gurney frame member. In another embodiment, the length of the support members is adjustable.

In yet another embodiment, each support members comprises a proximal element, a hollow distal element, wherein the proximal element telescopes into the distal element and means located at the proximal end of the distal element for interlocking the proximal element and the distal element. In still another embodiment, each support members comprises a hollow proximal element, a distal element, wherein the distal element telescopes into the proximal element and means located at the distal end of the proximal element for interlocking the proximal element and the distal element. In still another embodiment, the length of the support members is adjustable by the placement of a button on one element into a hole in the other element.

In yet another embodiment, each support member further comprises a proximal support element, a distal support element and collapsible means for articulating the proximal elements into proximal relation with the distal elements, said means located between the proximal element and the distal element, the collapsible means further having means for interlocking the proximal and distal support elements in an axial alignment.

In another embodiment, the means for interlocking the proximal and distal support elements in an axial alignment includes a pin of sufficient length to extend partially into both the proximal element and the distal element and a nipple radially extending from the pin into a C-shaped channel in the proximal element, such that when the proximal element is axially aligned with the distal element, and the nipple is in a lower end of the C-shaped channel, the support member is fully extended and the proximal element and distal elements are interlocked, and when the nipple is in an upper end of the C-shaped channel, the pin disengages the distal element thereby allowing the gurney handle to be partially folded down. In yet still another embodiment, the means for attachment to a gurney frame member includes swivel means for attaching the support members to a transversely, vertically or angularly directed frame member.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Referring now to the drawings, in particular FIGS. 1–15, the invention which is a gurney handle depicted generally as 10, comprises a generally U-shaped handle 12. The gurney handle 10 may be made of PVC pipe, plastic, rubber, wood, aluminum, stainless steel or other materials known in the art or combinations of these materials. The handle 12 has a transverse member 14 and two generally parallel support members 16,18. The transverse member 14 and the support members 16,18 may be a single manufactured piece, or the transverse member 14 may be connected to the support members 16,18. For example, the transverse member and the support members 16,18 may be manufactured as pieces of PVC, and the transverse member may be connected to the support members 16,18 by 90° elbow fittings known in the art. Other means for connecting the transverse member 14 and the support members 16,18 are also known in the art.

Figure 1:
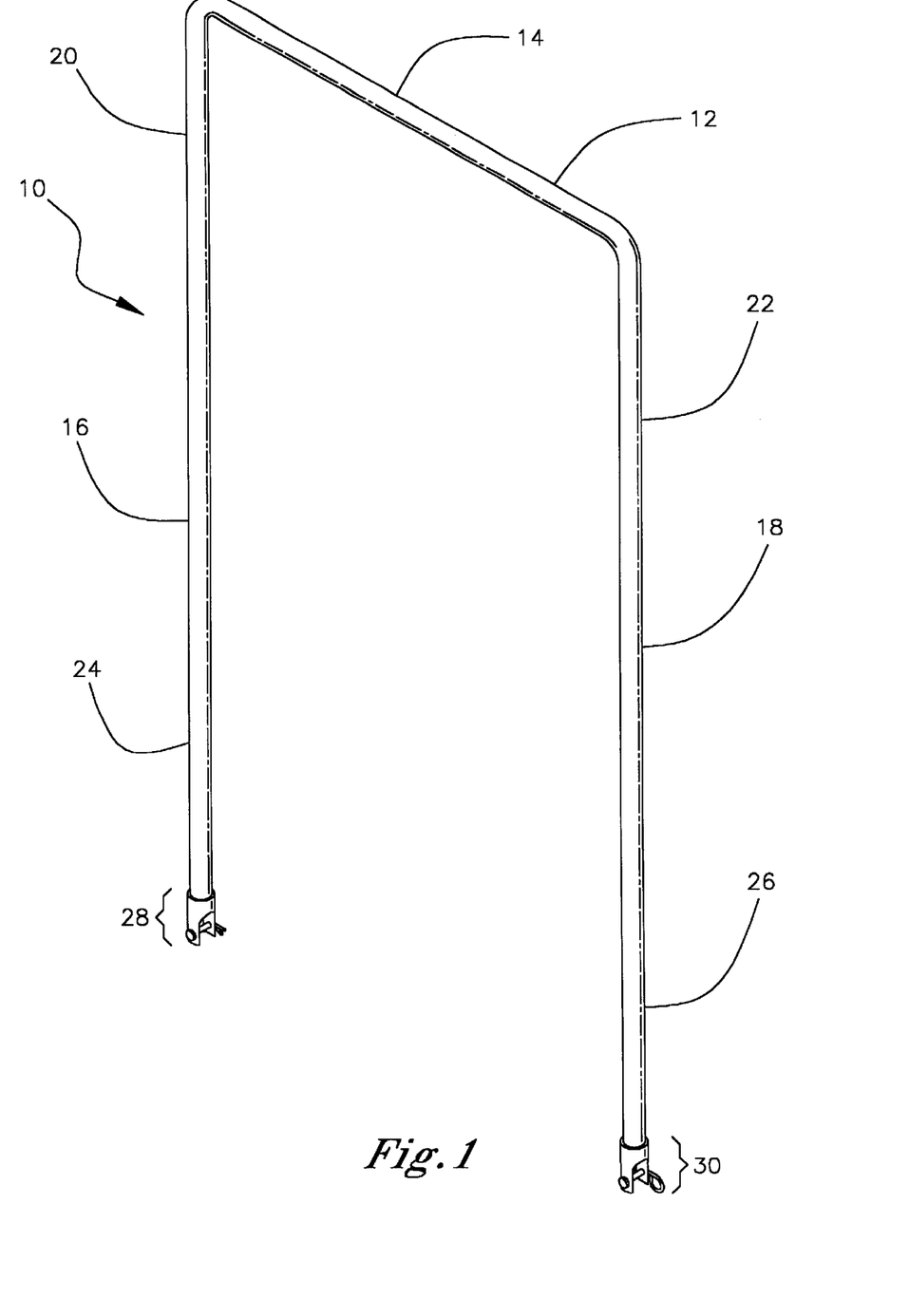
FIG. 1 is a perspective view from the front of an embodiment of the invention.

Each support member has a proximal end 20,22 and a distal end 24,26. As shown in FIG. 1, at the distal end 24,26 of each support member 16,18 are means for attachment 28,30 to one or more gurney frame members 32. Several means for attachment are contemplated. One example of an alternative embodiment for a means for attachment 28,30 is shown in detail in FIGS. 3, 5, 6 and 7. Although the following description relates to attachment 28, it is understood that attachment 30 would be the same. The attachment 28 includes a notch 28a for receiving the gurney frame member 32. The walls of the attachment 28 surrounding the notch 28a are pierced with holes 28b,28c approximately transverse to the notch 28a. After the gurney frame member 32 is inserted into the notch 28a, a pin 28d is placed through the holes 28b,28c, securing the gurney frame member 32. A locking device 28e, fitted through a hole 28f in the distal end of the pin 28d may secure the pin 28d within the holes 28b,28c. However, other means for securing the pin 28d into the holes 28b,28c are known in the art. For example, a cotter pin may be used or pin 28d may have a slot incorporated at the end of the pin 28d through which a blade-like extended pin portion is pivotally attached so that when the pin is inserted to secure the attachment means to the gurney frame member, the blade-like extended portion drops to prevent pin 28d from backing out.

Figure 4:
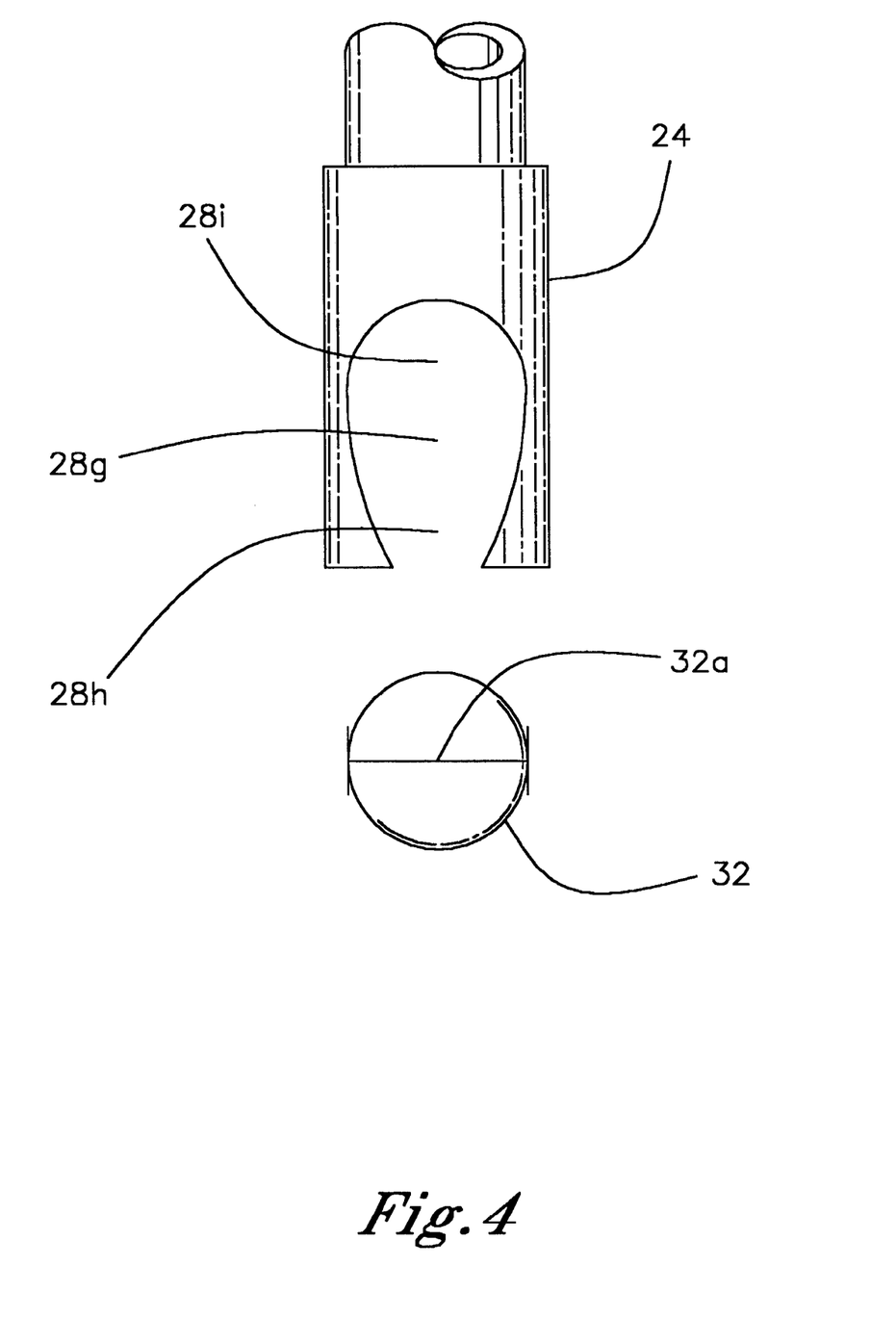
FIG. 4 is a side view of the attachment means of an embodiment of the invention.

Another example of an embodiment for the means for attachment 28 is shown in FIG. 4. The distal end 24 of the support member 16 may comprise a notch 28g such that the distal end 28h of the notch is narrower than the proximal end 28i of the notch. The notch 28g is of sufficient width so that the gurney frame member 32 can be introduced into the notch 28g. For certain materials, the width of the space at the proximal end 28i of the notch may be slightly less than the diameter 32a of the gurney frame member 32. For example, if the support member is manufactured in a hollow steel or aluminum form or other material which may provide resiliency, then the proximal end 28i of the notch 28g may be of a width slightly less than the diameter 32a of the gurney frame member 32 so that some force is needed to urge the notch 28g over gurney frame member 32. Other means for attachment are also contemplated in the art.

Figure 5:
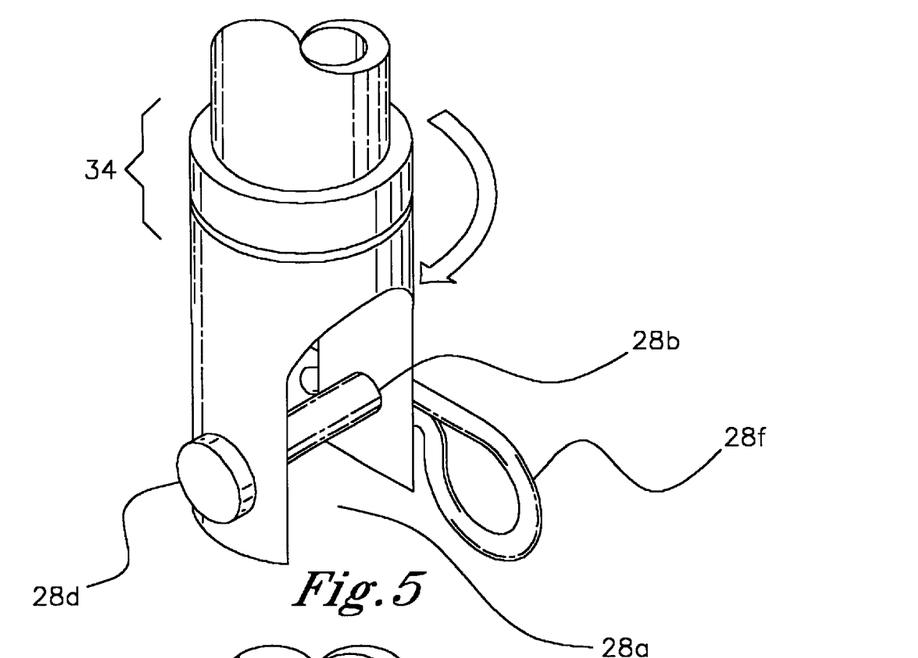
FIG. 5 is a perspective view from the side of the attachment means of an embodiment of the invention.
Figure 6:
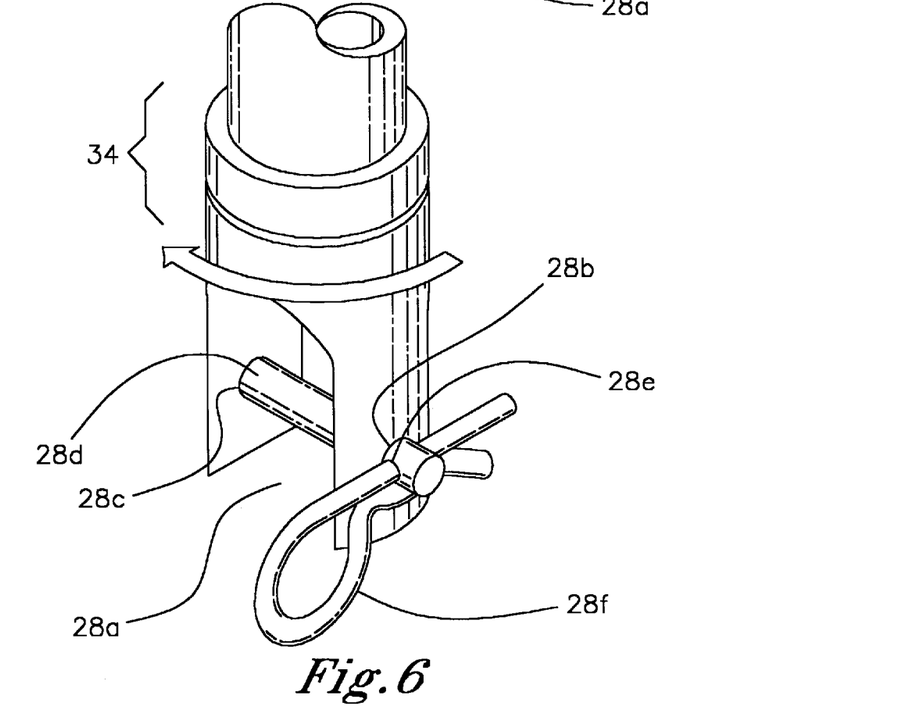
FIG. 6 is a perspective view from the opposite side of that shown in FIG. 5 of the attachment means of an embodiment of the invention.
Figure 7:
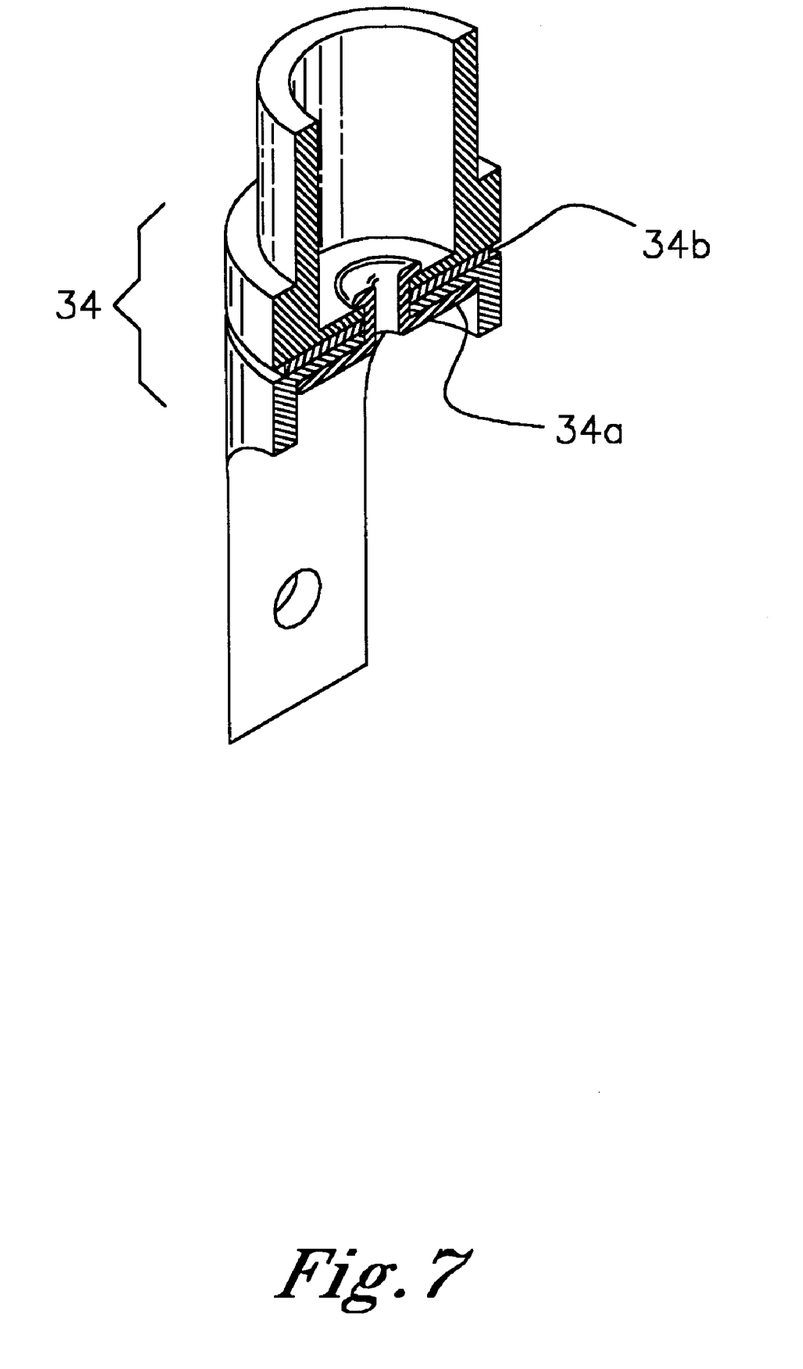
FIG. 7 is a split perspective view from the side of the attachment means of an embodiment of the invention.

In relation to each support member 16,18, the gurney frame member 32 may be transverse, vertical or angular. Also, as shown in FIGS. 5–7, the means for attachment 28 may include a swivel means 34 for attaching distal end 24,26 of support member 16,18 to a gurney frame member 32 oriented transversely, vertically or angularly. For example, a swivel joint 34a as is known in the art may be used. As shown in FIG. 7, the swivel joint 34a may comprise a washer 34b between the proximal end of the means for attachment 28 and the distal end of the means for attachment. The means for attachment 28 has a proximal end fixed to the distal end 24 of support member 16 and a distal end having a notch 28a that may rotate or swivel for engagement with suitable gurney frame member 32. The washer may be made of a material known in the art which promotes a swivel action and minimizes wear on the washer 34b. Examples of such materials are smooth metallic washers, Teflon washers, nylon washers, or roller bearings. The means for swiveling 34 may allow 360° rotation of the means for attachment 28.

Figure 8:
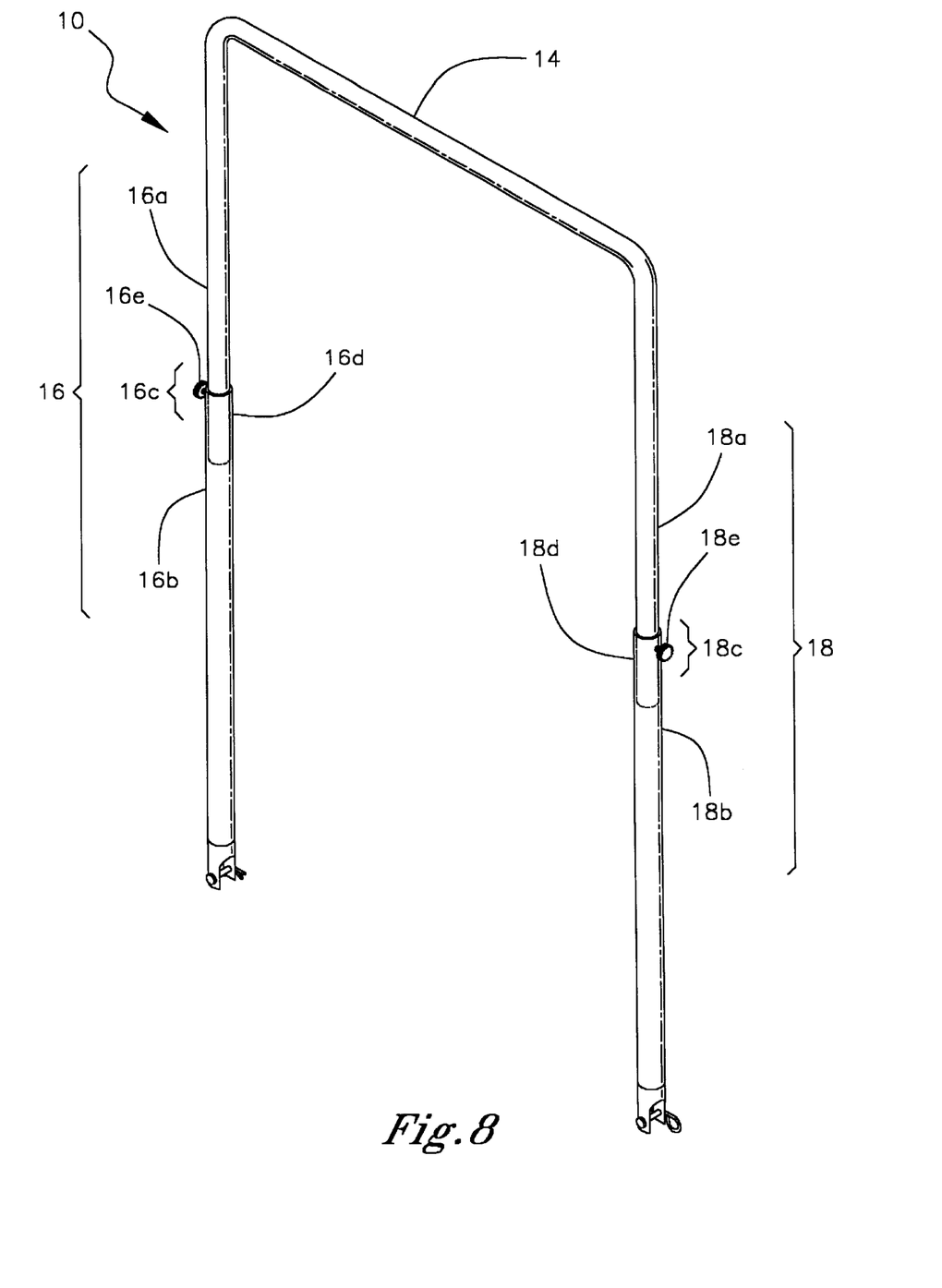
FIG. 8 is a front view of an embodiment of the invention.
Figure 9:
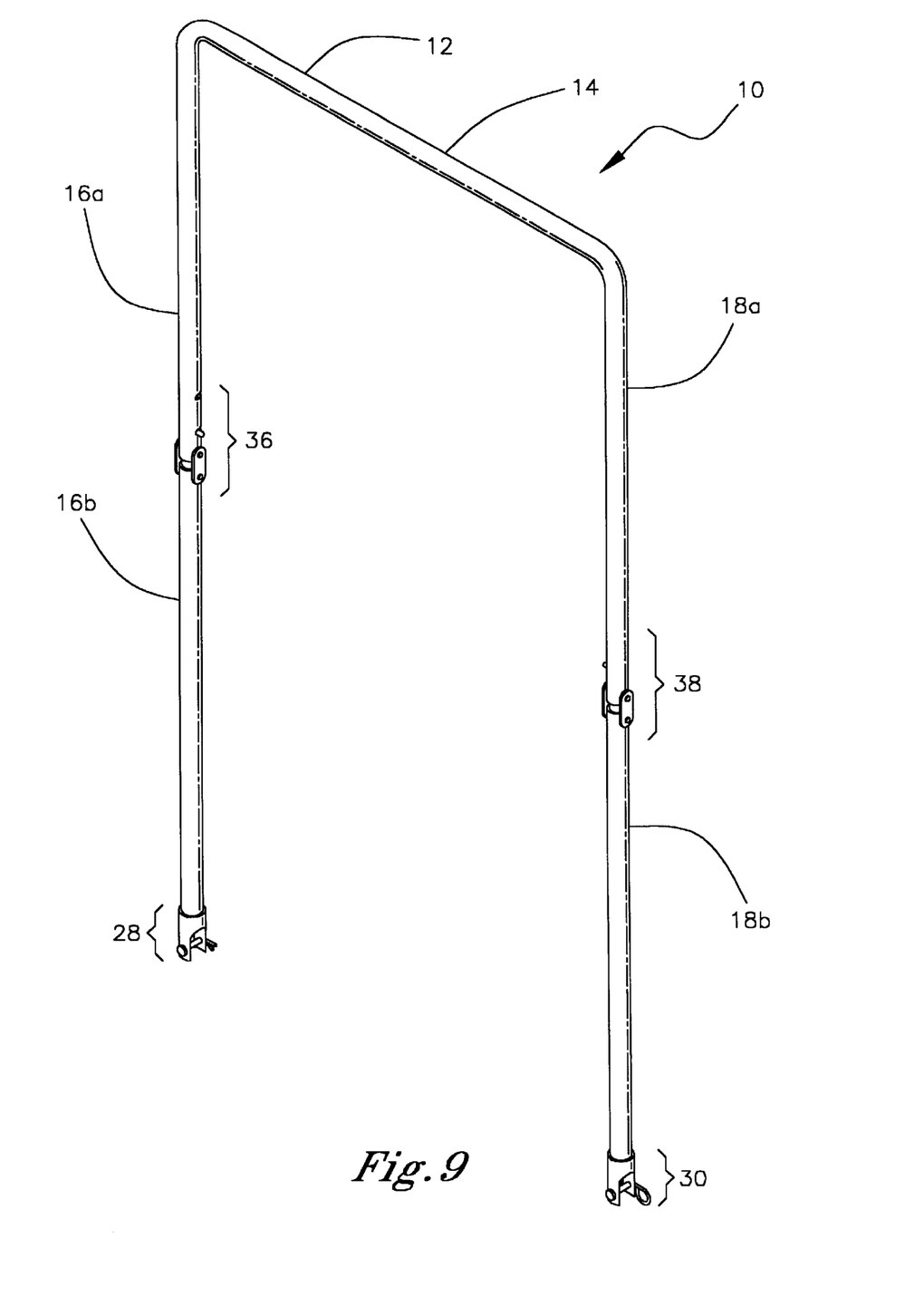
FIG. 9 is a perspective view from the front of an embodiment of the invention which is fully extended.
Figure 10:
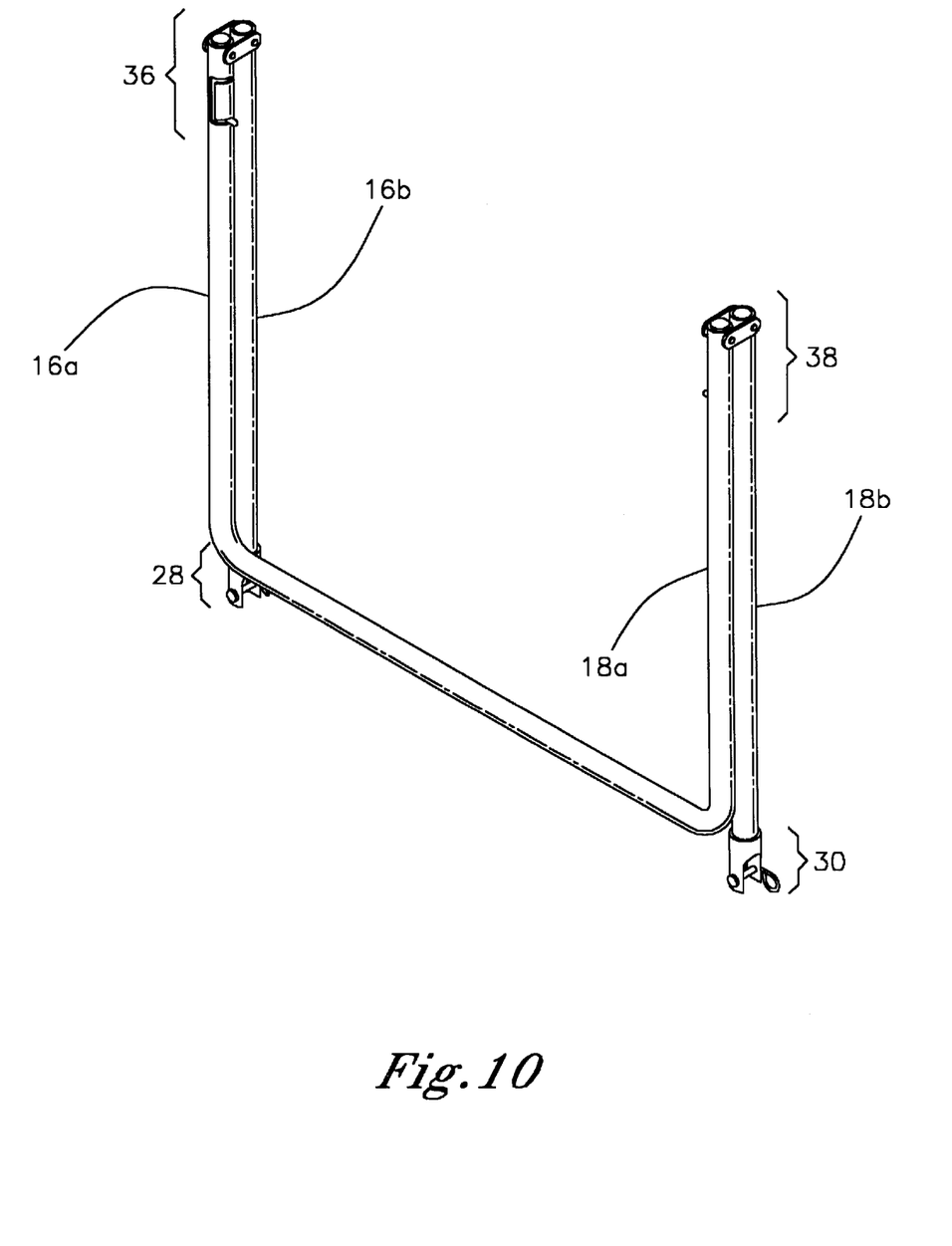
FIG. 10 is a perspective view from the front of an embodiment of the invention which is collapsed.

Alternatively, as shown in FIG. 8, each of the support members 16,18 may be adjustable in length. In this embodiment, the support members 16,18 each comprise a proximal element 16a,18a and a distal element 16b,18b. The distal elements 16b,18b are hollow, each having a bore of sufficient dimension to allow the proximal elements 16a,18a to telescope within the distal elements 16b,18b. In addition, the support members 16,18 comprise a means 16c for releasably interlocking the proximal elements 16a,18a with the distal elements 16b,18b. The means for releasably interlocking the proximal elements 16a,18a within the distal elements 16b,18b may be located on the proximal ends 16d,18d of the distal elements 16b,18b. The means for interlocking include a frictional holding device, such as a set screw, manually adjustable by means such as a wheel 16e, 18e. Other means for interlocking are known in the art. Other locations for the means 16c for releasably interlocking the proximal elements 16a,18a with the distal elements 16b,18b, such as on the proximal elements 16a,18a, are also contemplated. As another alternative, the proximal elements 16a,18a may be hollow, each having a sufficient bore to allow the distal elements 16b,18b to telescope into the proximal elements 16a,18a.

Figure 15:
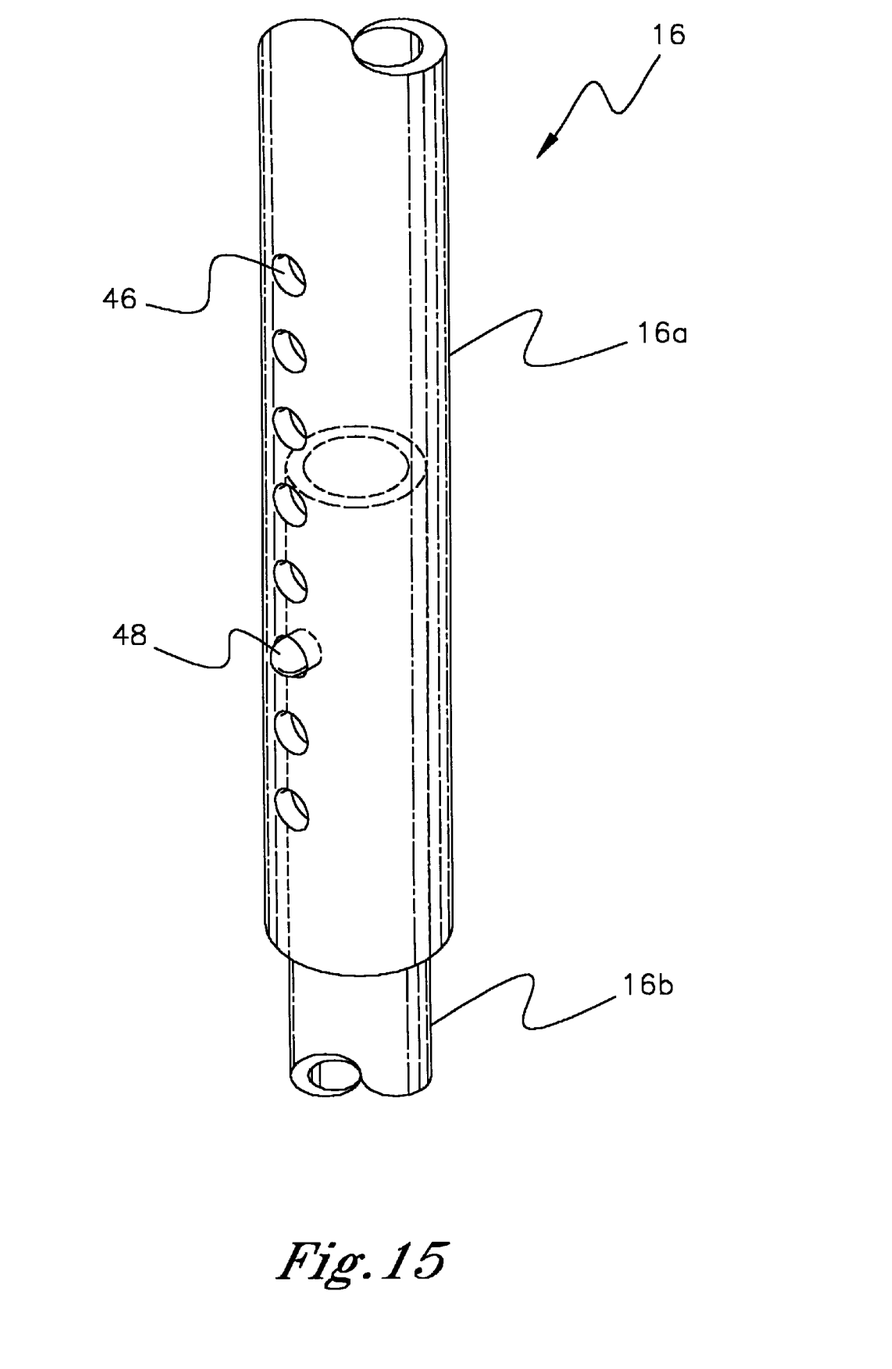
FIG. 15 is a perspective view from the side of one embodiment of the collapsible means.

Still another alternative is shown in FIG. 15. The proximal element 16a is hollow and of sufficient bore to allow the distal element 16b to telescope into the proximal element 16a. The proximal element 16a has one or more holes 46 in it, extending from the surface to the hollow interior of the proximal element 16a. The distal element 16b comprises a button 48 made to fit into the one or more holes 46. A user may depress the button 48 and alter the length of the support members 16,18, permitting the button 48 to fit into another hole 46 in the proximal element 16a, if one exists. The button may be operated by a spring, lever or other mechanism known in the art, or may be operated by a means manufactured into the distal element 16b utilizing the mechanical resilience of the material in the distal element 16b itself. Also, although the alternative of the proximal element 16a telescoping into the distal element 16b is illustrated, the case where the distal element 16b telescopes into the proximal element 16a is also contemplated. In addition, although FIG. 15 depicts an alternative for support element 16, it is also representative of support element 18. Other means for adjusting the length of the support members are also contemplated.

Yet another alternative embodiment is shown in FIGS. 9–13. The support members 16,18 each comprise a proximal element 16a,18a and a distal element 16b,18b. Between each of the proximal elements 16a,18a and the distal elements 16b,18b is a collapsible means 36,38 for articulating the proximal elements 16a,18a into proximal relation with the distal elements 16b,18b, that is, to either fold the gurney handle 10 for storage or when attached to a gurney to fold down the proximal elements 16a,18a so the gurney handle 10 is out of the way.

Figure 11:
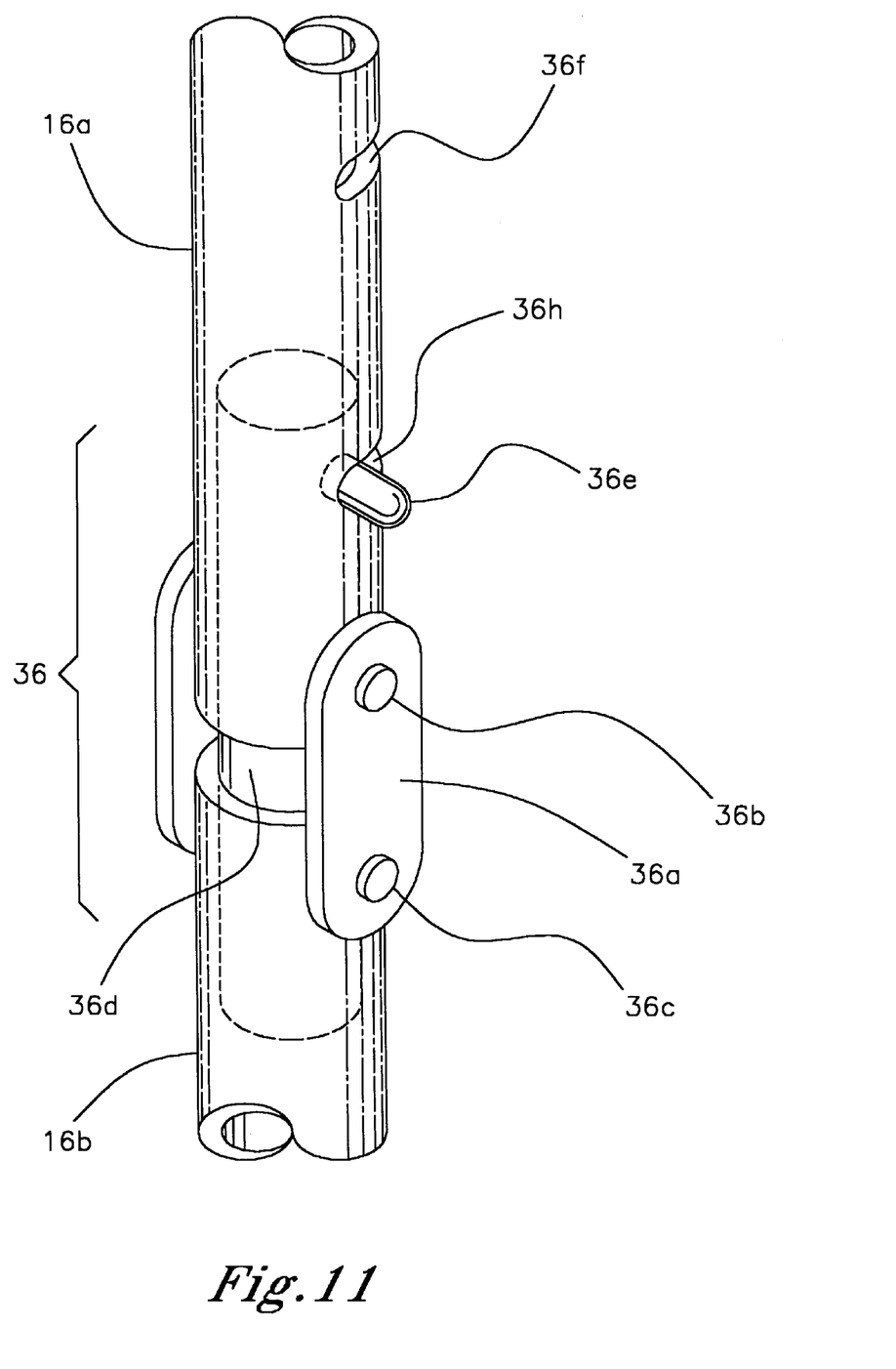
FIG. 11 is a perspective view from the side of the 9.A collapsible means when a support is in the fully extended configuration.
Figure 12:
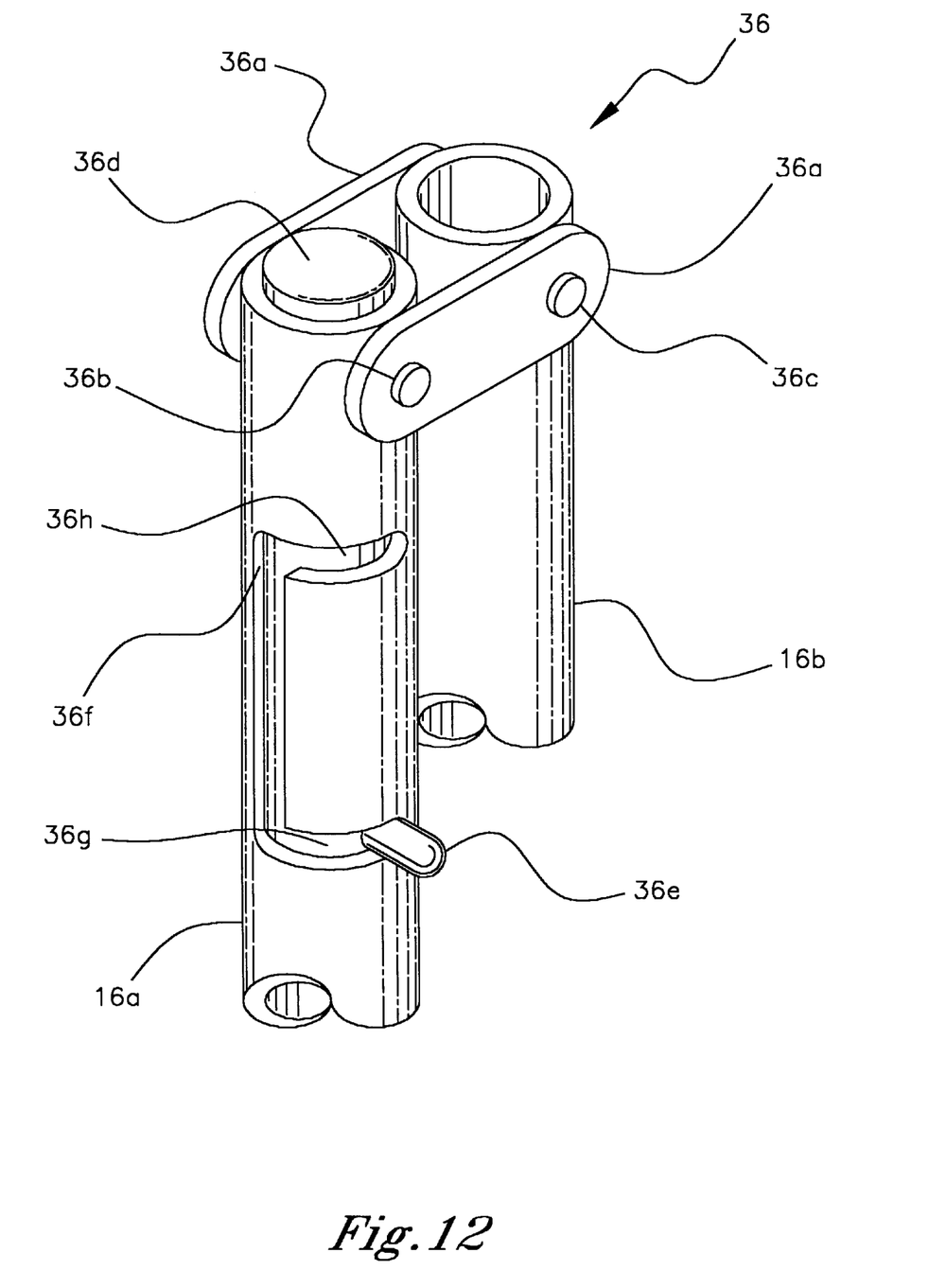
FIG. 12 is a perspective view from the side of the collapsible means when a support is in the collapsed configuration.

An example of one embodiment of the collapsible means 36 for articulating is shown generally in FIGS. 11 and 12. The collapsible means comprises one or more hinges 36a with two anchor points 36b,36c. The first anchor point 36b is located on the proximal element 16a. The second anchor point 36c is located on the distal element 16b. As shown in FIGS. 11 and 12, a pin 36d extending into the proximal element 16a is provided to interconnect the proximal element 16a and the distal element 16b. The pin 36d is of sufficient length to extend partially into both the proximal element 16a and the distal element 16b. On the pin 36d is a nipple 36e, which extends radially from the pin 36b into a C-shaped channel 36f in the proximal element 16a. When the nipple 36e is in the upper end 36g of the channel 36f, the pin 36b disengages the distal element thereby allowing the gurney handle 10 to be at least partially folded down. Thus, the hinges 36a allow the support member 16 to collapse so the proximal element 16a can be folded. Although FIG. 12 depicts a typical application of collapsible means 36, it is representative of collapsible means 38.

As shown in FIG. 11, the collapsible means 36 also comprises of means for interlocking the proximal support element 16a and the distal support element 16b into an axial alignment. The proximal element 16a may be placed in axial alignment with the distal element 16b. The nipple 36e may be moved to the lower end 36h of the C-shaped channel 36f, thereby moving the pin 36d such that a portion of pin 36d extends into the proximal element 16a and a portion of pin 36d extends into the distal element 16b. Thus, the support member 16 is fully extended and the proximal element 16a and the distal element 16b are interlocked. Other collapsible means for articulating the proximal elements 16a to proximal relation to the distal elements are also known in the art.

Figure 2:
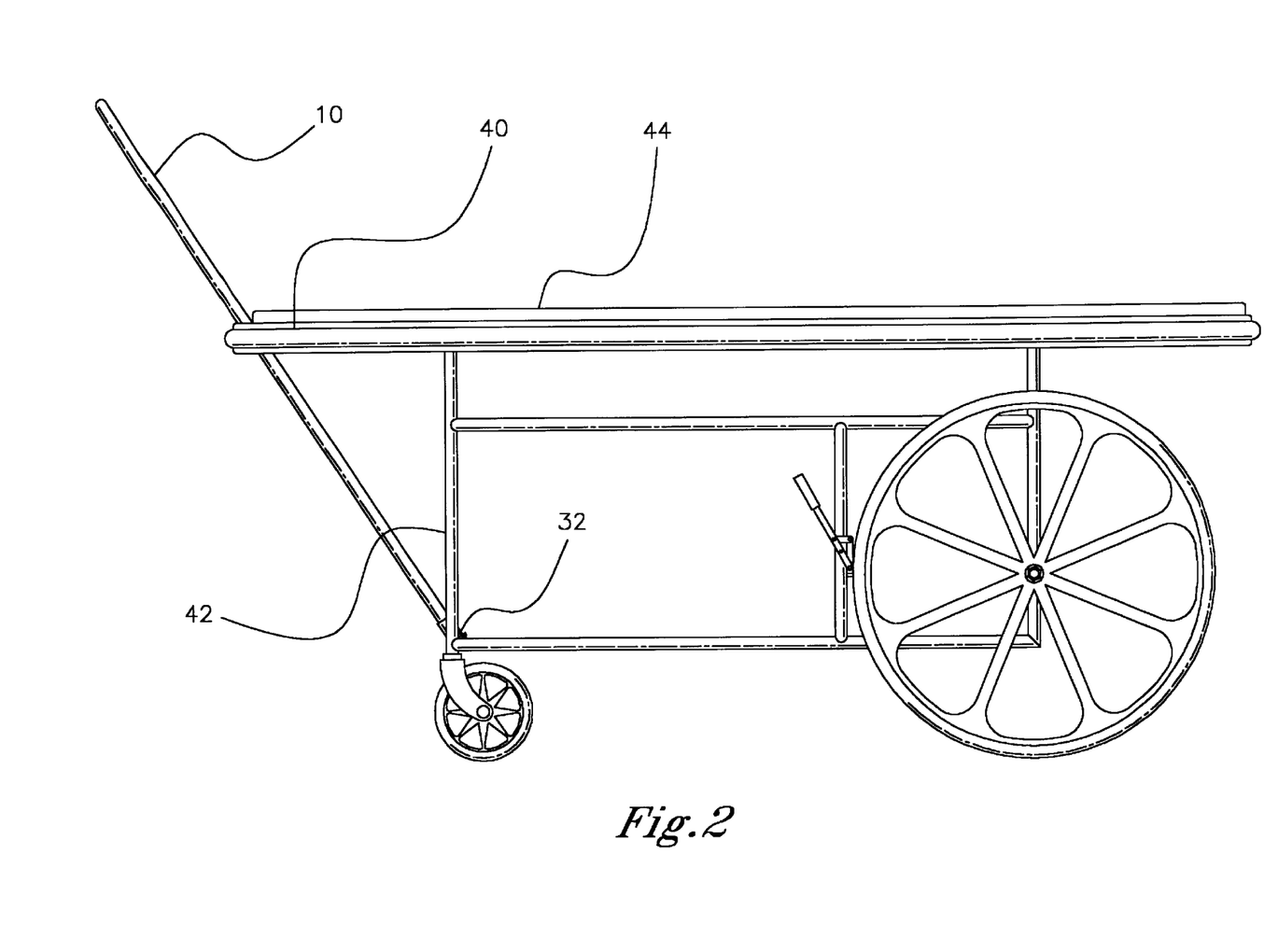
FIG. 2 is a perspective view from the side of an embodiment of the invention as used.
Figure 3:
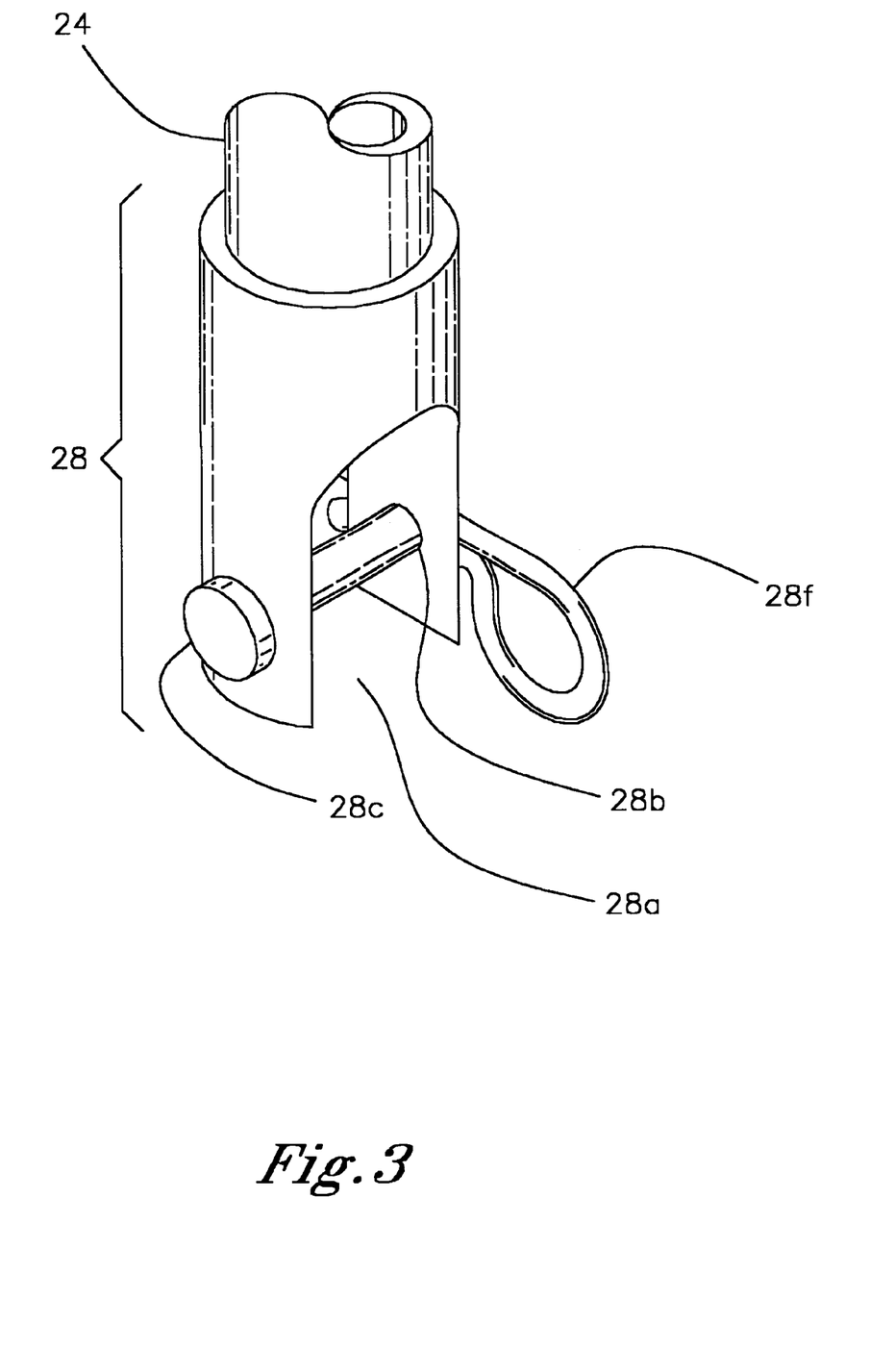
FIG. 3 is a perspective view from the side of the attachment means of an embodiment of the invention.
Figure 13:
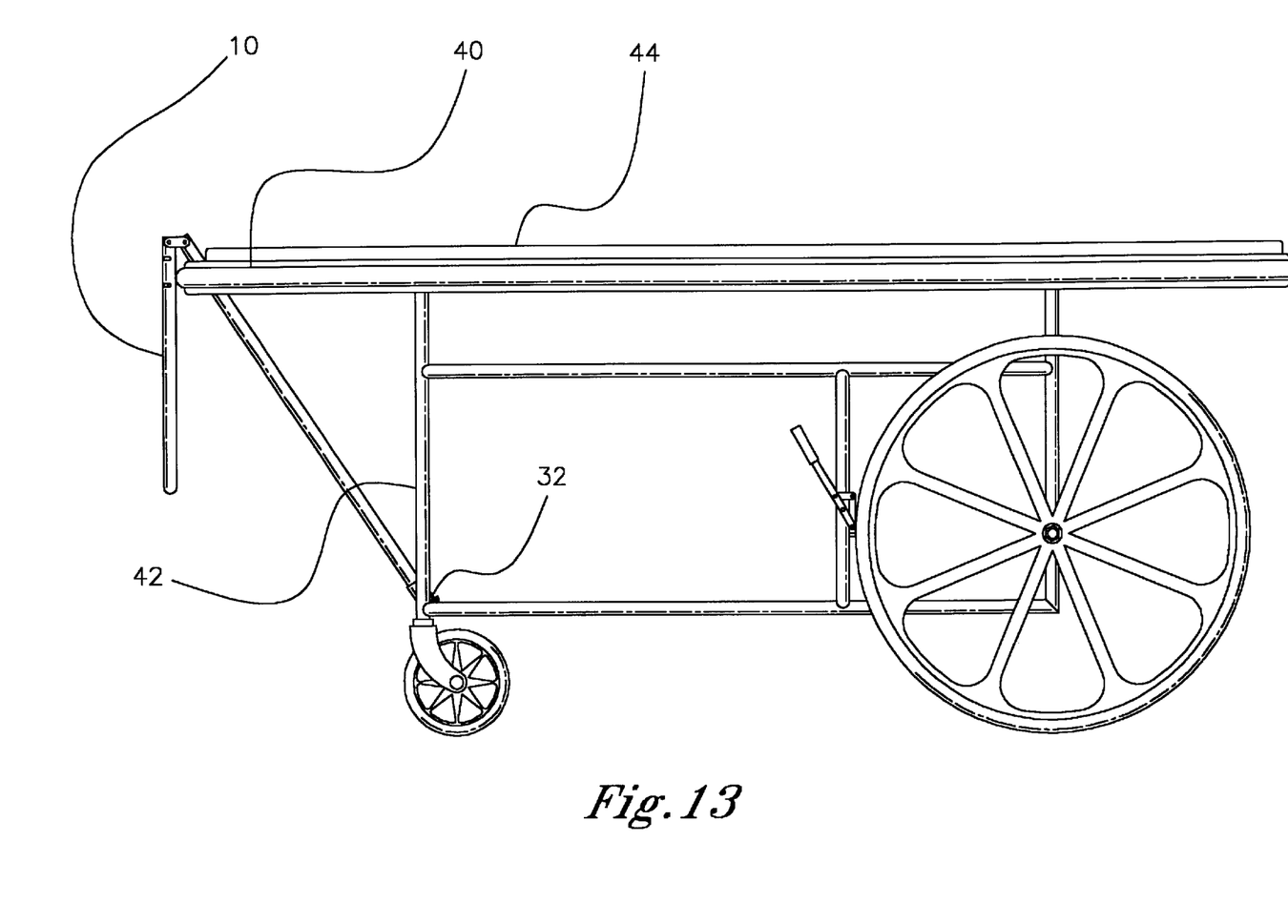
FIG. 13 is a perspective view from the side of one embodiment of the invention as used.
Figure 14:
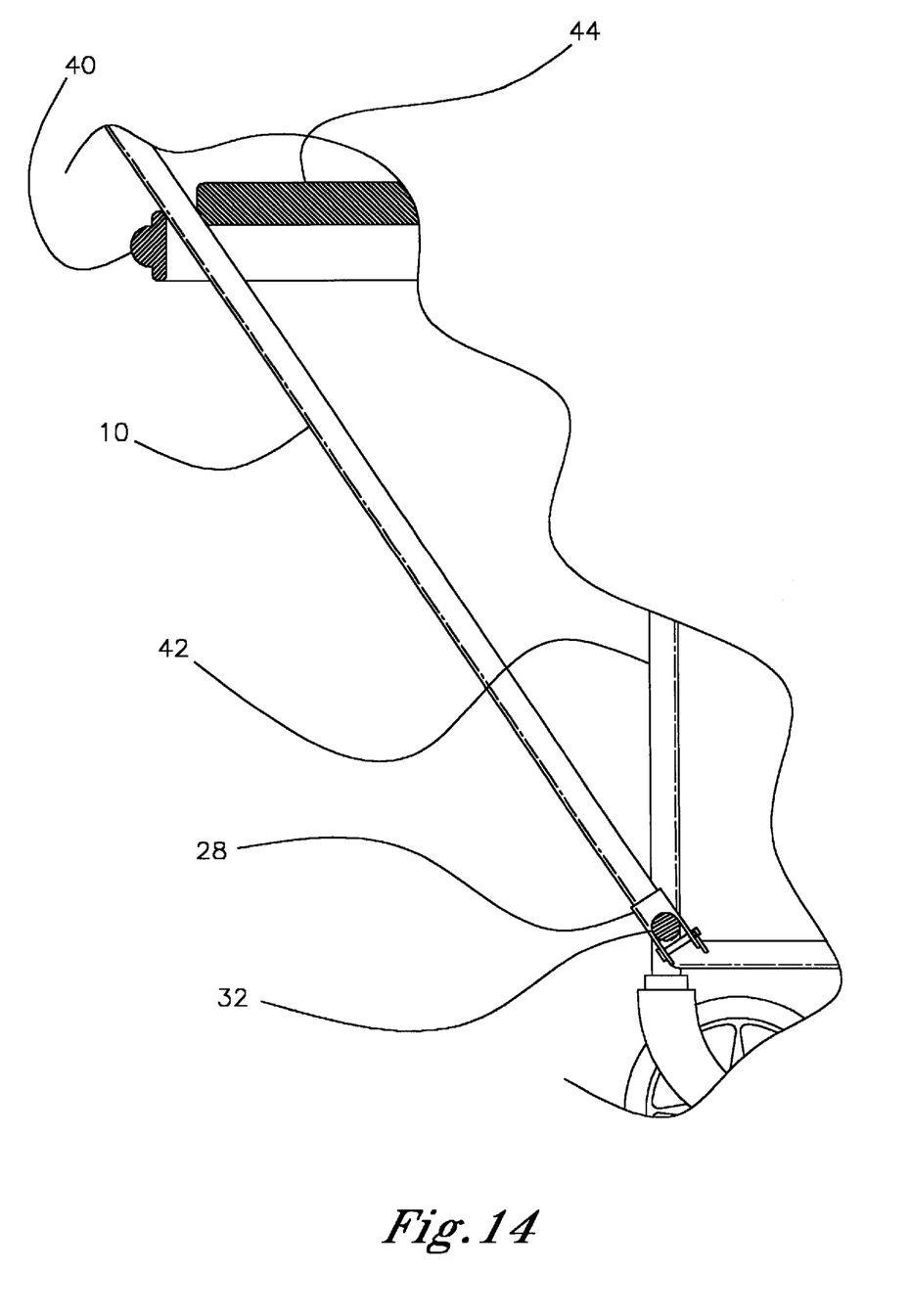
FIG. 14 is a cross-section view of one embodiment of the invention as used.

One embodiment of the gurney handle 10 attached to a gurney is shown in FIGS. 2, 13 and 14. The gurney handle 10 extends through the area between the guard rail 40 of the gurney 42 and the mattress 44. The means for attachment 28,30 to the gurney 42 are attached to the gurney frame member 32. In FIG. 2, the gurney frame member 32 is transverse with the support members 16,18. As shown in FIG. 13, the gurney handle 10 may be collapsed at a collapsible means 36,38 for articulating the proximal elements 16a,18a into proximal relation with the distal elements 16b,18b, that is, to fold the extended end of the gurney handle 10 out of the way.

As seen from the foregoing description, the present invention satisfies a long felt need to provide a gurney handle which attaches to a gurney frame member to provide a point above the guard rail 40 for a person to push or pull a gurney 42.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A gurney handle, comprising:
a generally U-shaped handle having a transverse member and two longitudinal generally parallel support members, each support member having a predetermined length and a proximal end and a distal end;
the distal end of each support member having means for attachment to a gurney frame member;
each support member further having a proximal support element depending from the transverse member to form the U-shaped handle, a distal support element alignable with the proximal support element, and collapsible means for articulating the proximal elements into proximal relation with the distal support elements, said means located between the proximal support element and the distal support element;
the collapsible means further having means for interlocking the proximal and distal support elements in an axial alignment; and
the means for interlocking the proximal and distal support elements in an axial alignment having a pin of sufficient length to extend partially into both the proximal element and the distal element, and a nipple radially extending from the pin into a C-shaped channel in the proximal element, wherein when the proximal element is axially aligned with the distal element, and the nipple is in a lower end of the C-shaped channel, the support member is fully extended and the proximal support elements and distal support elements are interlocked, and when the nipple is in an upper end of the C-shaped channel, the pin disengages the distal support element thereby allowing the gurney handle to be partially folded down.

2. A gurney handle, comprising:
a generally U-shaped handle having a transverse member and two longitudinal generally parallel support members, each support member having a predetermined length and a proximal end and a distal end; and
the distal end of each support member having means for attachment to a gurney frame member,
wherein the means for attachment to the gurney frame member includes swivel means for attaching the support members to one of a transversely, vertically or angularly directed frame member.

3. The gurney handle of claim 2, wherein the length of the support members is adjustable.

4. The gurney handle of claim 3, wherein each support member comprises:
a proximal element depending from the transverse member to form the U-shaped handle;
a hollow distal element aligned with the proximal element, wherein the proximal element telescopes into the hollow distal element; and
means located at a proximal end of the hollow distal element for interlocking the proximal element and the hollow distal element.

5. The gurney handle of claim 3, wherein each support member comprises:
a hollow proximal element depending from the transverse member to form the U-shaped handle;
a distal element aligned with the hollow proximal element, wherein the distal element telescopes into the hollow proximal element; and means located at a distal end of the hollow proximal element for interlocking the hollow proximal element and the distal element.

6. The gurney handle of claim 3, wherein each support member comprises:

a proximal element depending from the transverse member to form the U-shaped handle;

a hollow distal element aligned with the proximal element, wherein the proximal element telescopes into the distal element; and means for adjusting the length of the support members by inserting a depressible button on the proximal element into a hole in the distal element.

7. The gurney handle of claim 3, wherein each support member comprises:

a hollow proximal element depending from the transverse member to form the U-shaped handle;

a distal element aligned with the hollow proximal element, wherein the distal element telescopes into the proximal element; and means for adjusting the length of the support members by inserting a depressible button on the distal element into a hole in the proximal element.

\* \* \* \* \*